Oct. 18, 1966

H. J. KOZICKI 3,279,556

VEHICLE SUSPENSION SYSTEM

Filed Oct. 29, 1963

HENRY J. KOZICKI
INVENTOR.

BY J. R. Faulkner
J. D. Beck
ATTORNEYS

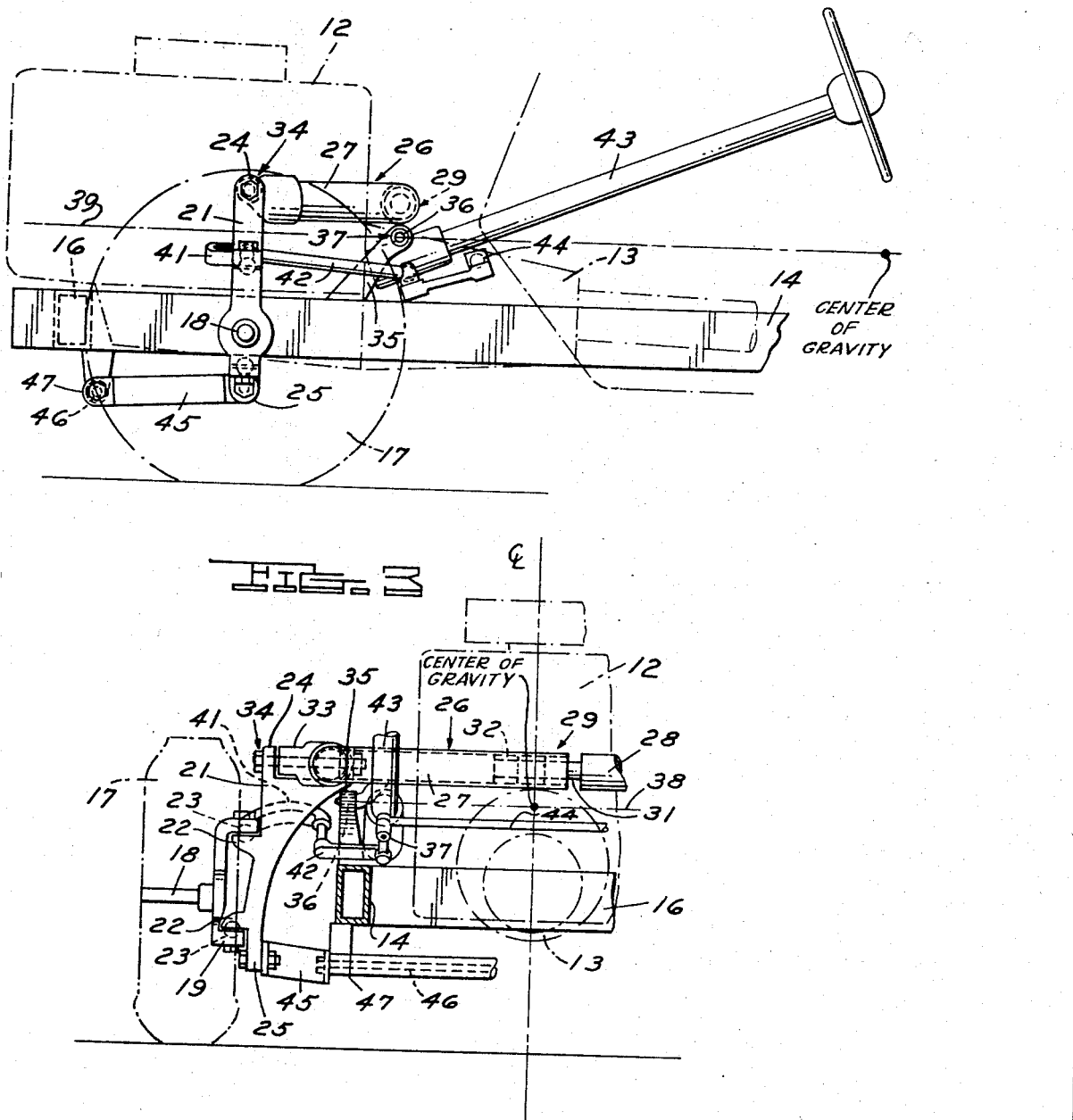

//<br>
United States Patent Office 3,279,556
Patented Oct. 18, 1966

---

3,279,556
VEHICLE SUSPENSION SYSTEM
Henry J. Kozicki, Orchard Lake, West Bloomfield Township, Oakland County, Mich., assignor to Ford Motor Company, Dearborn, Mich., a corporation of Delaware
Filed Oct. 29, 1963, Ser. No. 319,725
7 Claims. (Cl. 180—54)

This invention relates to a vehicle suspension system and more particularly to a modified independent front suspension for a motor vehicle that achieves most of the advantages of solid axle and independent spring-type suspension systems without their inherent disadvantages.

Currently, most motor vehicles in the United States are provided with front suspensions of the independent type. Although these suspensions provide many desirable characteristics in the handling of motor vehicles, one disadvantage has been excessive body roll. To substantially reduce body roll, sway bars are utilized to interconnect the two independently mounted wheels of such suspensions. Unfortunately, the utilization of sway bars effects an increase in wheel rates which does not permit the soft ride usually desired by the motoring public.

Suspension engineers trying to eliminate body roll without utilizing sway bars have found that its is necessary to raise the roll center to or above the center of gravity of the vehicle. Theoretically, this may be accomplished in independent front suspensions by tilting the upper and lower arms. As the theoretical roll center is assumed to be located at the point of intersection of the longitudinal roll axis of the vehicle and a line perpendicular to the arc of tire tread change during wheel movement, a large tread change will result which causes tire scrub. Thus, sway bars have been found to be the only acceptable way to counter body roll.

Solid axle front suspensions had been used in motor vehicles prior to the advent of independent-type front suspensions. They were low in cost and economical to maintain. In solid front axle suspensions it is possible to raise the roll center by raising the center of the solid axle and then universally connecting it to the sprung portion of the vehicle at a point above the center of gravity of the vehicle. This will eliminate body roll when the vehicle is cornering and still permit the lowering of wheel rates. But it has been found that other side effects have resulted from raising the roll center such as shimmy and side chuck. Side chuck can be described as follows:

As one road wheel encounters a bump and is driven upwardly, it rotates about the other road wheel which is still on the ground. Such movement is therefore in a lateral as well as in a vertical direction. In a vehicle having a high, effective roll center, this will result in a sideways movement of the body that can be readily felt by the occupants, causing objectionable discomfort as the vehicle travels on bumpy roads.

Accordingly, the suspension of this invention combines the desirable operational characteristics of independent-type suspension with the cost and soft ride advantages of solid axle-type suspensions. The suspension system of this invention is truly independent in that the movement of one road wheel in a vertical direction has no effect on the other road wheel. But it also behaves like a solid axle as both road wheels are rigidly interconnected in a horizontal plane. In body roll, the suspension system of this invention provides for a theoretically high roll center that has no accompanying tread change or side chuck effects and still affords the lowering of wheel rates.

In a preferred embodiment of this invention, a pair of laterally spaced wheel assemblies are provided and upon which the frame of a vehicle is supported. The wheel assemblies are interconnected by a transversely extending axle that comprises two segments having their outer extremities pivotally connected to the wheel assemblies. The two segments extend inwardly and rearwardly from the wheel assemblies and then bend to extend transversely before their inner ends are coaxially interconnected at the center of the vehicle. The transversely extending portions of both segments are pivotally connected to the frame at laterally spaced points. These pivotal connections together with the coaxial interconnection between the segments allow one wheel assembly to swing in a vertical plane with respect to the other wheel assembly while still maintaining both wheel assemblies rigidly inter-connected in a horizontal plane of the vehicle. The lower portion of each wheel assembly is pivotally connected to the frame by lever arms. The lever arm and axle segment connecting each wheel assembly to the frame constitute upper and lower suspension arms that are angularly disposed so as to provide proper antidive geometry.

The lateral forces acting on the axle during body roll are resisted by the laterally spaced pivotal connections between the segments and the frame. Theoretically, a roll center is effected at a point where these forces and their opposing forces are in balance. This roll center is assumed to lie on the intersection of the transversely extending axis passing through the laterally spaced pivotal connections and the longitudinally extending roll axis of the vehicle. The laterally spaced pivotal connections are raised to be located above the center of gravity and thus the theoretical roll center is also effectively raised. As the roll center lies rearwardly of the wheel assemblies, the lateral forces acting on the vehicle body are minimized to reduce the side chuck effect.

The principal object of this invention is to provide a relatively low-cost front suspension system for motor vehicles which has a high roll center to prevent body roll when the vehicle is cornering but at the same time reduces side chuck and shimmy so as to improve the riding characteristics of the vehicle.

A further object of this invention is to provide a motor vehicle suspension that provides a soft ride.

A still further object of this invention is to provide a suspension system which incorporates substantially fewer parts than conventional suspension systems presently in use thereby reducing its cost.

Other objects and advantages of this invention will become more apparent from the following description when viewed in connection with the accompanying drawings in which:

FIGURE 2 is a rear elevational view of one side portion of the suspension system shown in FIGURE 1; and, FIGURE 3 is a side elevational view of the suspension shown in FIGURE 1.

Figure 1:
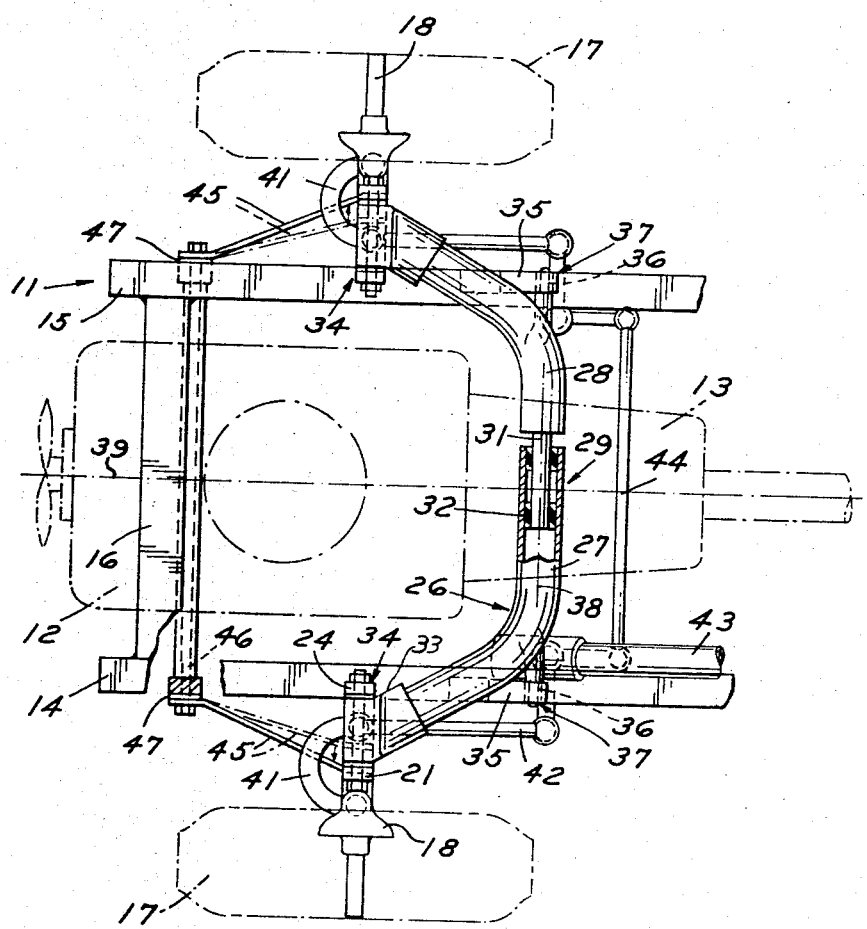
FIGURE 1 is a top plan view of a portion of a chassis of a motor vehicle incorporating the preferred embodiment of the suspension of the present invention.

Both ends of the suspension system of this invention are identical and therefore only one side of the front chassis section is shown in the rear elevational view of FIGURE 2.

Referring now to the drawings, FIGURE 1 discloses a portion of a vehicle frame 11 supporting an automotive engine 12 and its associated transmission 13, the latter two being shown in dot and dash lines. It is to be understood that the suspension system of this invention is equally suited to vehicles of unit body construction in which the frame 11 is replaced by structural members integrally formed with the vehicle body.

The frame 11 on which a vehicle body can be mounted comprises longitudinally extending side rails 14 and 15.

A transversely extending cross member 16 connects the side rails 14 and 15 at the front of the vehicle.

Left and right road wheels 17 are spaced outwardly of the side rails 14 and 15 and together with the suspension system of this invention form the unsprung portion of the vehicle. As best seen in FIGURE 2, each wheel 17 is rotatably supported on a spindle member 18. Each spindle member 18 is formed with an inwardly extending yoke 19. A spindle support member 21 is formed with two projections 22 that are connected to the yoke 19 by ball and socket joints 23.

The upper portion of each spindle support 21 extends above the spindle member 18 and is provided with a bifurcated hinge support 24 while the lower portion has a downwardly projecting flange 25.

An axle assembly of tubular construction, designated as 26, extends transversely of the vehicle, passing over the transmission 13 at a point above the center of gravity of the vehicle. The axle assembly 26 comprises two segments 27 and 28 that have their inner ends coupled by a concentric coaxial interconnection 29 spaced longitudinally and rearwardly from the spindle members 18. The coaxial interconnection 29 is formed by a pivot pin 31 extending axially from segment 28 and which is telescopically received in a selflubricating bushing 32 mounted within segment 27. The outer extremity of each segment 27 and 28 is integrally formed with a hinge socket 33 that is connected to the bifurcated hinge support 24 to provide an articulated connection 34. This permits slight articulated movement of each spindle support member 21 with respect to the axle assembly 26. The segments 27 and 28 extend from their outer extremities in a rearward and inward direction before continuing inwardly in a transverse direction to interconnect at the coaxial interconnection 29.

A bracket 35 extends upwardly from side rails 14 and 15. The upper end of the bracket 35 receives a hinge pin 36 extending outwardly from each transversely extending portion of segments 27 and 28 to effect a pivotal connection 37 at each side rail 14 and 15. Both pivotal connections 37 lie on an axis 38 that extends transversely through the center of both hinge pins 36 and are positioned even with or above the center of gravity of the vehicle. The longitudinally extending roll axis for the vehicle, designated as 39 and best seen in FIGURE 1, passes through the center of gravity to reduce objectionable body roll while the vehicle is cornering.

The upper portion of each spindle member 18 is connected to an arcuate steering arm 41 that attaches to a fore-and-aft drag link 42. The drag link 42 connects to a conventional steering gear 43. An idler rod 44 extending transversely of the vehicle above the transmission 13 connects to similar linkage at the other spindle member 18.

To stabilize the lower portions of the support member 21, a pair of diagonally extending lever arms 45 are provided. Each lever arm 45 has one end pivotally connected to the flange 25 and its other end attached to one end portion of a torsion bar 46. The torsion bar 46 extends through bushings 47 carried by side rails 14 and 15 and then connects to the other lever arm 45 to resiliently support the frame 11 upon the wheel assemblies. Other spring means may be provided to complement or replace the torsion bar suspension depicted.

The lever arms 45 in the illustrated embodiment are formed from a single leaf spring member and have their main dimension in a vertical plane. The diagonally extending spring-type lever arm 45 assist in resiliently resisting longitudinal forces developed during braking and acceleration of the vehicle.

Each pivotal connection 34 between the upper portion of each spindle support 21 and the outer extremity of each segment 27 and 28 is the most heavily loaded element in the suspension system of this invention as the moment created by the ground reaction is resisted by the respective outer end portion of segments 27 and 28 at this connection. To partially counteract this moment, the lever arm 45 may be first pivotally connected to the torsion bar 46 so that it will assume the free position as shown in dash lines in FIGURE 1. Then the rearward facing end of the lever arm 45 is pulled outwardly towards the wheel 17 before being connected to the flange 25 at the lower end of the support member 21. This will bring about a laterally inward force which acts on the lower portion of the support member 21 to counter the moment created by the upward movement of the wheel 17, thereby partially unloading each pivotal connection 37.

From the foregoing description, it can be readily understood that no tread or camber change takes place as each wheel assembly is free to rise vertically at a constant distance from the roll axis 39 of the vehicle. If desired, some small tread and camber angle may be introduced by inclining the pivotal axis of the connection 34 between each spindle support 21 and the axle assembly 26 with respect to the horizontal plane of the vehicle and an axis passing through the centers of the road wheels as seen in the plan view, respectively.

The theoretical roll center of the suspension system of this invention coincides with the point of intersection of the axis 38 and the roll axis 39 of the vehicle. As this theoretical roll center is effectively equal to or above the height of the center of gravity, body roll is eliminated. Side chuck is reduced to a point where it has no detrimental effect on the occupants of the vehicle as the theoretical roll center is spaced rearwardly from the road wheels and the connections 37 between the spindle supports 21 and the axle assembly 26 are articulated. The axle assembly 26 maintains both road wheels in a generally parallel relationship to each other to improve the cornering ability of the vehicle. Shimmy is practically eliminated as one road wheel may rise vertically and independently with respect to the other road wheel. The angular disposition of the lever arms 45 and the segments 27 and 28 pivotally connecting the spindle supports 21 to the frame 11 permits the ground contact point of each wheel 17 to move upwardly and forwardly during jounce to effect proper antidive geometry for the vehicle.

Further, the automotive designer is allowed greater freedom of design and position of the automotive engine since interference with suspension members such as conventional lower arms in independent suspension is eliminated. Thus, engine size may be increased and additional accessories may be readily installed.

It will be understood that the invention is not to be limited to the exact construction shown and described but that various changes and modifications may be made without departing from the spirit and scope of the invention as defined in the appended claims.

What is claimed is:

1. A motor vehicle having a vehicle body mounted on a frame, a pair of laterally spaced wheel assemblies upon which said frame is spring supported, an axle having two outer extremities and a center portion extending generally transversely of said vehicle at a level even with or above the center of gravity thereof, means connecting said center portion to said frame for pivotal movement of said outer extremities about a transverse axis of said vehicle, said outer extremities being pivotally connected to said wheel assemblies, said axle being arranged and constructed to maintain said pair of wheel assemblies rigidly interconnected in a horizontal plane of said vehicle and permitting pivotal movement of one wheel assembly with respect to the other wheel assembly in a vertical plane of said vehicle.

2. A motor vehicle having a frame structure, a pair of laterally spaced road wheels, a support means for each road wheel upon which said frame structure is resiliently supported, an axle comprising two segments, each segment having a generally transversely extending inner portion and an outer portion, the outer extremities of the outer portions being pivotally connected to said support means, said inner portion of one of said two segments being pivotally connected to the inner portion of the other of said segments, the inner portions of said two segments being also pivotally connected to said frame structure for pivotal movement about an axis extending generally transversely of said vehicle, said axis being longitudinally spaced from said support means and being at a level even with or above the center of gravity of said vehicle, said axle being constructed and arranged to maintain said road wheels in a general parallel relationship to each other in a horizontal plane of said vehcile, the outer extremity of the outer portion of each segment being adapted for pivotal movement about said transverse axis with respect to the outer extremity of the other outer portion in a vertical plane of said vehicle.

3. A motor vehicle having a frame structure, a pair of laterally spaced road wheels, generally vertically extending support means for each road wheel upon which said frame structure is resiliently supported, an elongated structure comprising two segments, each segment having a generally transversely extending inner portion and an outer portion extending in an outward and forward direction from its inner portion, said outer portion of each segment being pivotally connected to said support means, the inner ends of said inner portions of each segment being pivotally interconnected, the outer ends of each inner portion being connected to said frame structure for pivotal movement about an axis extending transversely of said vehicle, said axis being longitudinally rearwardly spaced from said support means and being at a level even with or above the center of gravity of said vehicle, said axle being constructed and arranged to maintain said road wheels in a parallel relationship to each other in a horizontal plane of said vehicle and permitting the pivotal movement of one road wheel about said axis with respect to the other road wheel in a vertical plane of said vehicle.

4. A motor vehicle having a frame structure, a pair of laterally spaced road wheels, a generally vertically extending support means for each road wheel upon which said frame structure is resiliently supported, an axle comprising two segments, each segment having a generally transversely extending inner portion and an outer portion extending in an outward and forward direction from its inner portion, each outer portion being pivotally connected to the vertical support means, said inner portions of the segments being connected to said frame structure for pivotal movement about an axis extending generally transversely of said vehicle, said axis being longitudinally and rearwardly spaced from said support means and lying at a level even with or above the center of gravity of said vehicle, the inner portions of said segments being pivotally interconnected to permit the outer portion of one segment to swing about said generally transverse axis with respect to the outer portion of the other segment in a vertical plane of said vehicle, said axle maintaining one road wheel in a substantial parallel relationship with the other road wheel in a horizontal plane of said vehicle, and a pair of lever arms, each lever arm having one end connected to said frame and its other end connected to one of said support means.

5. A motor vehicle having a vehicle body, an engine, and a transmission mounted on a frame, a pair of road wheels carried on spindle members and disposed on opposite sides of said frame, vertically extending spindle supports pivotally connected to said spindle members, an axle comprising two tubular segments, each segment having a generally transversely extending inner portion and an outer portion extending in an outward and forward direction from said inner portion, said axle being elevated so that the inner portion of said segments passes over said transmission, the outer portion of each segment being pivotally connected to the upper portion of one spindle support, said transversely extending inner portions of both segments connected to said frame for pivotal movement about an axis extending transversely of said vehicle, said axis being longitudinally and rearwardly spaced from said spindle members and lying at a level even with or above the center of gravity of said vehicle, the inner portions of said segments being pivotally connected to each other to permit the outer portion of one segment to swing about said axis with respect to the outer portion of the other segment in a vertical plane of said vehicle, said axle maintaining one road wheel in substantial parallel relationship with the other road wheel in a horizontal plane of said vehicle, and a pair of generally longitudinally extending lever arms, each lever arm having one end pivotally connected to the lower portion of one of said spindle supports and its other end pivotally connected to said frame.

6. A motor vehicle having a vehicle body, an engine, and a transmission mounted on a frame, a pair of road wheels carried by spindle members and disposed on opposite sides of said frame, vertically extending spindle supports pivotally connected to said spindle members, an axle comprising two segments, each segment having an inner portion extending transversely of said vehicle integrally formed with an outer portion extending in an outward and forward direction from said inner portion, said axle being elevated so that the inner portion of said segments pass over the transmission, the outer portion of each segment being pivotally connected to the upper portion of one spindle support, said transversely extending inner portions of both segments connected at transversely spaced points to said frame for pivotal movement about an axis extending transversely of said vehicle, said axis being longitudinally rearwardly spaced from said spindle members and lying at a level even with or above the center of gravity of said vehicle, the inner extremities of each inner end of said segments being pivotally connected to each other, the outer portion of one segment adapted to swing about said axis with respect to the outer portion of the other segment in a vertical plane of said vehicle, said axle maintaining one road wheel in a parallel relationship with the other road wheel in a horizontal plane of said vehicle, and a pair of generally longitudinally extending lever arms, each lever arm having one end pivotally connected to said frame forward of said spindle members and its other end connected to the lower portion of one of said spindle supports.

7. The motor vehicle as described in claim 6 and which is further characterized in that each lever arm is a single leaf spring member with its main section disposed in a vertical plane, said lever arm being bent outwardly before being connected to the lower portion of each spindle support to provide a laterally inward force on the lower portion thereof after being pivotally connected thereto.

References Cited by the Examiner

UNITED STATES PATENTS

| | | | |
|---|---|---|---|
| 1,803,055 | 4/1931 | Causan | 280—106.5 |
| 2,138,438 | 11/1938 | Wagner | 280—124 |
| 2,256,069 | 9/1941 | Wagner | 267—57 |
| 2,965,185 | 12/1960 | Marchetti | 280—106.5 |
| 3,105,699 | 10/1963 | Peras | 280—96.2 |
| 3,174,771 | 3/1965 | Muller | 267—19 |

FOREIGN PATENTS 386,632    1933    Great Britain.

BENJAMIN HERSH, *Primary Examiner.*

MILTON SMITH, *Examiner.*